(12) United States Patent
Drexler

(10) Patent No.: US 10,377,511 B2
(45) Date of Patent: *Aug. 13, 2019

(54) INTERPLANETARY SPACECRAFT USING FUSION-POWERED CONSTANT-ACCELERATION THRUST

(71) Applicant: Jerome Drexler, Los Altos Hills, CA (US)

(72) Inventor: Jerome Drexler, Los Altos Hills, CA (US)

(*) Notice: Subject to any disclaimer, the term of this patent is extended or adjusted under 35 U.S.C. 154(b) by 283 days.

This patent is subject to a terminal disclaimer.

(21) Appl. No.: 15/490,056

(22) Filed: Apr. 18, 2017

(65) Prior Publication Data

US 2018/0105292 A1 Apr. 19, 2018

Related U.S. Application Data

(60) Provisional application No. 62/408,959, filed on Oct. 17, 2016.

(51) Int. Cl.
*B64G 1/40* (2006.01)
*B64G 1/12* (2006.01)
*B64G 1/46* (2006.01)

(52) U.S. Cl.
CPC ............ *B64G 1/12* (2013.01); *B64G 1/401* (2013.01); *B64G 1/403* (2013.01); *B64G 1/405* (2013.01);
(Continued)

(58) Field of Classification Search
CPC ........ B64G 1/409; B64G 1/407; B64G 1/408; F03H 3/00; F03H 99/00; F03H 1/00
See application file for complete search history.

(56) References Cited

U.S. PATENT DOCUMENTS 9,068,562 B1* 6/2015 Budica ................ F03H 1/00
2006/0126771 A1* 6/2006 Da Conceicao ....... F03H 1/00
376/100

(Continued)

FOREIGN PATENT DOCUMENTS

CA    2153406 A1    7/1994
JP    H08211190 A    8/1996
(Continued)

OTHER PUBLICATIONS

Beals et al., "Project Longshot: An Unmanned Probe to Alpha Centauri", U.S. Naval Academy, Report for 1987-1988, 74 pages.
(Continued)

*Primary Examiner* — J. Woodrow Eldred
(74) *Attorney, Agent, or Firm* — Thomas Schneck; Mark Protsik

(57) ABSTRACT

A spacecraft propulsion method uses cosmic ray triggered nuclear micro-fusion events to provide repeated or continuous thrust for artificial gravity during a space flight. In one embodiment, successive packages of deuterium-containing micro-fusion particle fuel material is projected in a specified direction outward from a spacecraft. In another embodiment, the micro-fusion fuel material is a coating upon a set of angled rings arranged circumferentially around the spacecraft. In a third embodiment, the micro-fusion fuel is dispersed in proximity to "wind" turbines to generate electricity for ion thrusters. In each case, the material interacts with the ambient flux of cosmic rays to generate micro-fusion products having kinetic energy that either produce thrust upon the spacecraft or drive the turbines whose electrical output in turn powers the ion thrusters.

16 Claims, 4 Drawing Sheets

(52) U.S. Cl.
CPC ............. *B64G 1/408* (2013.01); *B64G 1/409* (2013.01); *B64G 1/46* (2013.01); *B64G 2700/00* (2013.01)

(56) References Cited

U.S. PATENT DOCUMENTS

| | | |
|---|---|---|
| 2008/0123793 A1 | 5/2008 | Loan et al. |
| 2009/0000268 A1* | 1/2009 | Yurash .................... B64G 1/405 60/202 |
| 2015/0098543 A1* | 4/2015 | Cohen .................... B64G 1/408 376/131 |
| 2018/0033496 A1* | 2/2018 | Sedwick .................. G21B 1/15 |

FOREIGN PATENT DOCUMENTS

| | | |
|---|---|---|
| WO | WO9013125 A1 | 11/1990 |
| WO | WO9222909 A1 | 12/1992 |
| WO | WO2014114986 A1 | 7/2014 |

OTHER PUBLICATIONS

J.J. Hopkins Laboratory for Pure and Applied Science, General Atomic division of General Dynamics, "Nuclear Pulse Space Vehicle Study", Chapter 2, Sep. 19, 1964, 30 pages.

Martin et al., "Project Daedalus: The Propulsion System—Part 1: Theoretical Considerations and Calculations", 1978, scan copy, 49 pages.

Schmidt et al., "Nuclear Pulse Propulsion—Orion and Beyond", 36th AIAA/ASME/SAE/ASEE Joint Propulsion Conference & Exhibit, Jul. 16-19, 2000, https://ntrs.nasa.gov/archive/nasa/casi.ntrs.nasa.gov/20000096503.pdf>.

SpaceX, "First-stage landing—Onboard camera", YouTube, May 27, 2016, 1 page, https://youtu.be/4jEz03Z8azc>.

Aguilar et al., "Precision Measurement of the Proton Flux in Primary Cosmic Rays from Rigidity 1 Gv to 1.8 TV with the Alpha Magnetic Spectrometer on the International Space Station", Physical Review Letters, PRL 114, 171103, May 1, 2015, 9 pages.

Alvarez et al., "The Catalysis of Nuclear Reactions by mu Mesons", Lawrence Berkeley National Laboratory, Dec. 10, 1956, 5 pages.

Nakamura et al. (revised by Beatty et al.), "Cosmic Rays", JP G 37, 075021, Feb. 16, 2012, 21 pages.

Hassler et al., "Mars' Surface Radiation Environment Measured with the Mars Science Laboratory's Curiosity Rover", Science, Nov. 12, 2013, 35 pages.

Jackson, "A Personal Adventure in Muon-Catalyzed Fusion", Physics in Perspective 12, 2010, pp. 74-88.

Jackson, "Muon Catalysis of Fusion: A Commentary", Lawrence Berkeley Laboratory, Physics Division, Aug. 1984, 12 pages.

Kaye & Laby, NPL, "Cosmic Rays", 4 pages, http://www.kayelaby.npl.co.uk/general_physics/2_7/2_7_7.html.

Kaye & Laby, NPL, "Nuclear Fusion", 9 pages, http://www.kayelaby.npl.co.uk/atomic_and_nuclear_physics/4_7/4_7_4.html.

Cucinotta et al., "Space Radiation Cancer Risk Projections and Uncertainties—2012", NASA/TP-2013-217375, Jan. 2013, chapter 2—pp. 9-41.

Nuclear Power, "Photoneutrons", Nov. 3, 2015, 3 pages, https://www.nuclear-power.net/nuclear-power/fission/delayed-neutrons/photoneutrons/>.

U.C. Berkeley Physics 250, "Cosmic Rays", Neutrino/Nuclear Astrophysics, Spring 2011, Class Notes, Chapter 9, pp. 1-36, available from Univ. of Washington, www.int.washington.edu/PHYS554/2011/chapter9_11.pdf.

* cited by examiner

INTERPLANETARY SPACECRAFT USING FUSION-POWERED CONSTANT-ACCELERATION THRUST

CROSS-REFERENCE TO RELATED APPLICATION

This application claims priority under 35 U.S.C. 119(e) from prior U.S. provisional application 62/408,959 filed Oct. 17, 2016.

TECHNICAL FIELD

The present invention relates to providing thrust, as well as artificial gravity, to interplanetary spacecraft with human occupants, and further relates to inducement of controlled muon-catalyzed nuclear micro-fusion, as well as micro-fusion obtained from fuel bombardment with high-energy particles (particle-target fusion).

BACKGROUND ART

For space travel, whether between the Earth and the Moon or traveling among the planets (or any of its moons), it's often a good idea to minimize the propellant mass needed by your spacecraft and its launch vehicle. In a typical space-flight scenario, a spacecraft will fire its rocket engines to accelerate in order to reach some planned velocity, and will then, when those rocket engines are shut off, continue under its own inertia with the same speed and trajectory it has attained.

It is useful when traveling between planets in the solar system to consider that spacecraft as being in orbit around the Sun. The trajectory with minimal propellant usage is a transfer orbit in which the desired orbit's perihelion (closest approach to the Sun) will be at the distance of Earth's orbit and its aphelion (farthest distance from the sun) will be at the distance of Mars' orbit or of some other destination planet. (Likewise, for journeys to the inner planets of Mercury or Venus, the aphelion will coincide with Earth's orbit and the perihelion will coincide with the destination planet's orbit. It uses its rocket to accelerate opposite the direction of Earth's revolution around the sun, thereby decreasing its orbital energy.) Thus, in the typical scenario, most of the journey between the planets will then consist of coasting towards its destination with the engines turned off. Then to be captured into the destination planet's orbit, the spacecraft must then decelerate relative to that planet using a retrograde rocket burn or some other means.

The typical accelerate-coast-decelerate scenario works well with unmanned probes. However, this will subject human astronauts to long periods of weightlessness during the coasting phase lasting 6 months or longer, depending on peak velocity. Additionally, long trip times will potentially expose astronauts to both solar and cosmic ray radiation. It is known from previous space missions, especially the experience developed from astronauts spending periods of time on space stations (Skylab, Salyut, Mir, and most recently the International Space Station), that weightlessness has adverse health effects upon humans.

The human body on Earth is constantly sensing the effects of gravity and working against it, largely unconsciously. Our muscles (e.g., calves, quadriceps, buttocks, and the erector spinae surrounding the spinal column) are sculpted by the force of gravity in a state of constant exercise, being perpetually loaded and unloaded as we go about our daily lives, even when we are not really "exercising". But in the absence of gravity these muscles begin to waste away, and subjects can lose as much as a third of total muscle mass in a little over a week, even when physical exercise is deliberately imposed as part of a strength maintenance regimen. The human heart is the body's most important muscle, but also be comes deconditioned when it no longer has to work against gravity to pump blood vertically to the brain. Likewise, bones dynamically maintain their structure to contend with gravitational forces on Earth, but in weightlessness are subject to space-flight-induced osteoporosis as bone calcium finds its way into the bloodstream and is excreted (also causing renal stones, constipation and psychological depression). Many of the physiological changes undergone during prolonged weightlessness are hypothesized to be at least partially permanent, so longitudinal studies of former astronauts are being conducted, even though the necessarily small sample size makes preliminary results inconclusive at the present time. Spaceflight designers have envisioned a number of ways to create an artificial gravity in space, basically constant acceleration of some form, the seemingly most straightforward of which is from the acceleration due to spacecraft thrust.

In order to slow sufficiently to obtain orbital capture by the destination planet, the spacecraft must use about the same amount of fuel that it used to speed up originally. In general, if we want to reduce the travel time between Earth and Mars or some other planet, the more fuel we will need in order to accelerate the spacecraft to a higher coasting velocity and consequently the more fuel will need upon arrival to slow down in order to enter the planet's orbit and then to land. Maximum fuel usage occurs if one accelerates the spacecraft for fully one-half of the journey, with no coasting phase, and then decelerates over the remaining half of the journey. Present spacecraft systems use liquid fuels that constitute a very large percentage of the overall mass. If one could save fuel in some way, while still achieving the desired acceleration, coasting velocity and deceleration, one could shorten travel time or carry more passengers and/or cargo.

Several projects have explored the possibility of nuclear spacecraft propulsion. The first of these was Project Orion from 1958-1963 built upon general proposals in the 1940s by Stanislaw Ulam and others, in which external atomic detonations would form the basis for a nuclear pulse drive. Later, between 1973 and 1978, Project Daedalus of the British Interplanetary Society considered a design using inertial confinement fusion triggered by electron beams directed against fuel pellets in a reaction chamber. From 1987 to 1988, Project Longshot by NASA in collaboration with the US Naval Academy developed a fusion engine concept also using inertial confinement fuel pellets but this time ignited using a number of lasers. Naturally, these last two projects depend upon successfully achieving nuclear fusion.

Muon-catalyzed fusion was observed by chance in late 1956 by Luis Alvarez and colleagues during evaluation of liquid-hydrogen bubble chamber images as part of accelerator-based particle decay studies. These were rare proton-deuteron fusion events that only occurred because of the natural presence of a tiny amount of deuterium (one part per 6000) in the liquid hydrogen. It was quickly recognized that fusion many orders of magnitude larger would occur with either pure deuterium or a deuterium-tritium mixture. However, John D. Jackson (Lawrence Berkeley Laboratory and Prof. Emeritus of Physics, Univ. of California, Berkeley) correctly noted that for useful power production there would need to be an energetically cheap way of producing muons.

The energy expense of generating muons artificially in particle accelerators combined with their short lifetimes has limited its viability as an Earth-based fusion source, since it falls short of break-even potential.

Another controlled fusion technique is particle-target fusion which comes from accelerating a particle to sufficient energy so as to overcome the Coulomb barrier and interact with target nuclei. To date, proposals in this area depend upon using some kind of particle accelerator. Although some fusion events can be observed with as little as 10 KeV acceleration, fusion cross-sections are sufficiently low that accelerator-based particle-target fusion are inefficient and fall short of break-even potential.

It is known that cosmic rays are abundant in interplanetary space. Cosmic rays are mainly high-energy protons (with some high-energy helium nuclei as well) with kinetic energies in excess of 300 MeV. Most cosmic rays have GeV energy levels, although some extremely energetic ones can exceed $10^{18}$ eV. FIG. 5 shows cosmic ray flux distribution at the Earth's surface. In near-Earth space, the alpha magnetic spectrometer (AMS-02) instrument aboard the International Space Station since 2011 has recorded an average of 45 million fast cosmic ray particles daily (approx. 500 per second). The overall flux of galactic cosmic ray protons (above earth's atmosphere) can range from a minimum of 1200 $m^{-2}$ $s^{-1}$ $sr^{-1}$ to as much as twice that amount. (The flux of galactic cosmic rays entering our solar system, while generally steady, has been observed to vary by a factor of about 2 over an 11-year cycle according to the magnetic strength of the heliosphere.) Outside of Earth's protective magnetic field (e.g. in interplanetary space), the cosmic ray flux is expected to be several orders of magnitude greater. As measured by the Martian Radiation Experiment (MARIE) aboard the Mars Odyssey spacecraft, average in-orbit cosmic ray doses were about 400-500 mSv per year, which is an order of magnitude higher than on Earth.

Cosmic rays are known to generate abundant muons from the decay of cosmic rays passing through Earth's atmosphere. Cosmic rays lose energy upon collisions with atmospheric dust, and to a lesser extent atoms or molecules, generating elementary particles, including pions and then muons, usually within a penetration distance of a few cm. Typically, hundreds of muons are generated per cosmic ray particle from successive collisions. Near sea level on Earth, the flux of muons generated by the cosmic rays' interaction by the atmosphere averages about 70 $m^{-2}$ $s^{-1}$ $sr^{-1}$. The muon flux is even higher in the upper atmosphere. These relatively low flux levels on Earth reflect the fact that both Earth's atmosphere and geomagnetic field substantially shields our planet from cosmic ray radiation. Mars is a different story, having very little atmosphere (only 0.6% of Earth's pressure) and no magnetic field, so that muon generation at Mars' surface is expected to be very much higher than on Earth's surface. Planetary moons, such as Phobos and Deimos around Mars, would experience similar high levels of cosmic ray flux.

In recent years, there have been proposals to send further spacecraft to Mars in 2018 and then manned space vehicles to Mars by 2025. One such development project is the Mars Colonial Transporter by the private U.S. company SpaceX with plans for a first launch in 2022 followed by flights with passengers in 2024. The United States has committed NASA to a long-term goal of human spaceflight and exploration beyond low-Earth orbit, including crewed missions toward eventually achieving the extension of human presence throughout the solar system and potential human habitation on another celestial body (e.g., the Moon, Mars).

It is generally expected to take about nine months to travel to Mars. To get to Mars in less time would require that one burn the rocket engines longer to achieve a higher coasting velocity, but this uses more fuel and isn't feasible with current rocket technology. Likewise, to provide a constant acceleration from thrust (one of the possible artificial gravity schemes) would require the rocket engines burn constantly over the entire flight, leading to even more fuel usage. Even using the standard accelerate-coast-decelerate trajectory, the spacecraft has an overall payload of 100 metric tons, calling for a significant weight penalty in fuel for its liquid rocket engines. Once Mars orbit is reached, the vehicle is too massive to rely upon parachutes and/or a "sky crane" tethered system to descend to the Martian surface. Supersonic retro-propulsion using thrust from large rocket engines are expected to do the job.

The advancing of propulsion technologies would improve the efficiency of trips to Mars and could shorten travel time to Mars, reduce consumables and mass of materials required for the journey, and reduce astronaut health risks from both weightlessness and radiation exposure. Sustained investments in early stage innovation and fundamental research in propulsion technologies is required to meet these goals.

This research and development activity is expected to proceed in several general stages, beginning with an Earth-reliant stage with research and testing on the ISS of concepts and systems that could enable deep space, long-duration crewed missions, followed by a proving ground stage in cis-lunar space to test and validate complex operations and components before moving on to largely Earth-independent stages. Such a proving ground stage would field one or more in-space propulsion systems capable of reaching Mars to undergo a series of shakedown tests to demonstrate their capabilities, select a final architecture, and make needed upgrades revealed by the shakedown tests. While systems already in development for the initial Earth-reliant missions largely make use of existing technologies, investment in the development of newer technologies will be needed to meet the longer-term deep space challenges.

SUMMARY DISCLOSURE

The present invention is a method of spacecraft propulsion that takes advantage of the abundance of cosmic rays available for free in interplanetary space and the abundance of muons generated on Mars or other planet (or their moons) with a thin (or no) atmosphere and weak (or no) magnetic field to catalyze sufficient fusion events to produce useful thrust. Here the thrust is available for producing constant acceleration during an interplanetary spaceflight and thereby provide some artificial gravity. The cosmic rays and muons are available here for free and do not need to be generated artificially in an accelerator. Since the amount of energy needed for thrust is generally much less than the multi-kiloton yields of atomic weapons, "micro-fusion" is the term used here to refer to fusion energy outputs of not more than 10 gigajoules per second (2.5 tons of TNT equivalent per second), to thereby exclude macro-fusion type explosions.

One way to achieve this continuous thrust is to project successive packages of micro-fusion fuel targets (pellets, chips or powder) in a specified direction outward from the spacecraft. The micro-fusion target material will then interact with the ambient flux of cosmic rays and muons producing a combination of particle-target micro-fusion and/or muon-catalyzed micro-fusion, generating kinetic-energy-containing fusion products that produce an accelerating or decelerating thrust against vehicle. An external pusher configuration similar to that proposed for any of Projects Orion, Daedalus or Longshot could be used to receive the thrust, except that here it is billions of controlled micro-fusion events, not atomic explosions, that are the source of that thrust.

In another embodiment, the micro-fusion target material may be embedded in a set of rings that are oriented at a 45° angle and arranged around the spacecraft. The micro-fusion target material on these rings would be exposed to cosmic rays, producing fusion events at these rings, which will propel the spacecraft forward. The spacecraft would be turned around for the latter half of the journey so that the fusion rings generate a decelerating thrust.

In yet another embodiment, the fusion target material may be located in a set of cartridges exposed to cosmic rays, along with corresponding turbine electric generators that are driven by the "wind" of helium fusion products (alpha products) impinging on the turbine blades. These cartridge-generator assemblies may be coupled to the spacecraft via cables to supply electricity to the spacecraft.

The deuterium "fuel" for the particle-target and/or muon-catalyzed micro-fusion may be supplied in the form of solid $Li^6D$ as chips, pellets or powder, or even heavy water ($D_2O$) or liquid deuterium ($D_2$). Muon-created muonic deuterium can come much closer to the nucleus of a similar neighboring atom with a probability of fusing deuterium nuclei, releasing energy. Once a muonic molecule is formed, fusion proceeds extremely rapidly (~$10^{-10}$ sec). One cosmic ray particle can generate hundreds of muons, and each muon can typically catalyze about 100 micro-fusion reactions before it decays (the exact number depending on the muon "sticking" cross-section to any helium fusion products).

Other types of micro-fusion reactions besides D-D are also possible depending upon the target material. For example, another reaction is $Li^6+D \rightarrow 2He4+22.4$ MeV, where much of the useful excess energy is carried as kinetic energy of the two helium nuclei (alpha particles). Additionally, any remaining cosmic rays can themselves directly stimulate micro-fusion events by particle-target fusion, wherein the high energy cosmic ray particles (mostly protons, but also helium nuclei) bombard relatively stationary target material. When bombarded directly with cosmic rays, the lithium-6 may be transmuted into tritium which could form the basis for some D-T micro-fusion reactions. Although D-D micro-fusion reactions occur at a rate only 1% of D-T micro-fusion, and produce only 20% of the energy by comparison, the freely available flux of cosmic rays and their generated muons should be sufficient to yield sufficient micro-fusion energy output for practical use.

The present invention achieves nuclear micro-fusion using deuterium-containing target material, and the ambient flux of cosmic rays and generated muons that are already naturally present. The optimum concentration of the target material for the particle-target and muon-catalyzed fusion may be determined experimentally based on the particular abundance of cosmic rays with a view to maintaining billions of micro-fusion reactions for producing adequate thrust for the specified application, while avoiding any possibility of a runaway macro-fusion event.

At a minimum, since both particle-target micro-fusion and muon-catalyzed micro-fusion, while recognized, are still experimentally immature technologies (since measurements have only been conducted to date on Earth using artificially accelerated particles and generated muons from particle accelerators), various embodiments of the present invention can have research utility to demonstrate feasibility in environments beyond Earth's protective atmosphere and/ or geomagnetic field, initially above Earth's atmosphere (e.g. on satellite platforms) for trial purposes, and then on the Moon or the surface of Mars, in order to determine optimum parameters for various utilities in those environments. For example, the actual number of micro-fusion reactions for various types of fusion fuel sources and target configurations, and the amount of rocket thrust that can be derived from such reactions, are still unknown and need to be fully, quantified in order to improve the technology.

The fusion-enhanced space vehicle requires strong cosmic ray flux to create sufficient nuclear micro-fusion for thrust purposes. Therefore, it applies primarily to the final stage of a multistage rocket fired from Earth or any stage fired from Mars or the Moon. A chemical-based rocket may be used to first lift the spacecraft from Earth into orbit (and possibly also insertion from Earth orbit into an initial trajectory headed toward its deep-space destination), and then the micro-fusion propulsion is used for the spacecraft's flight to its destination as well as for deceleration to obtain orbit at the destination.

In still another embodiment, instead of nuclear fusion, continuous acceleration or deceleration (artificial gravity) may be provided by an ion thruster that could be powered by a set of solar photovoltaic cells covering the surface of the spacecraft. The electrical power generated by the cells would accelerate ions out the tail of the spacecraft to generate thrust. Since the spacecraft would be constantly exposed to light from the sun during an interplanetary journey, as long as a reservoir of ion producing material is available, the thrust would be continuously maintained.

DETAILED DESCRIPTION

The goal of the invention is to shorten the travel time to Mars or other planets and their moons (to reduce cumulative radiation doses to which the astronauts are subject) and likewise to provide a continuous acceleration to offset or reduce weightlessness during the journey. Cosmic ray flux naturally present in interstellar space is used to power nuclear micro-fusion events (via particle-target micro-fusion and muon-catalyzed micro-fusion) that will propel the spacecraft, as well as generate electrical energy. In another version, solar cells on the spacecraft exterior may be used to power an ion thruster for propulsion. Avoiding a weightless coasting phase of an interplanetary trajectory accomplishes the goal of both shorter travel times and providing an artificial "gravity" via the accelerating or decelerating thrust of the spacecraft.

Ideally, the amount of continuous acceleration or deceleration (artificial gravity) will be sufficient to prevent or minimize the adverse health effects that would otherwise occur from long-term weightlessness. How much acceleration/deceleration might be needed may depend on factors still to be quantified by further research aboard platforms like the International Space Station, including the duration of the flight, but a magnitude that is at least some specified portion (e.g., at least 25% and preferably at least 40%) of the gravitation at the target planet or moon should be the objective. For example, the amount of acceleration could be chosen to equal that of the destination planet or moon (about 0.38 G for Mars), so that astronauts will be ready for work upon arrival, without the need for an extensive recuperation period to adjust to the gravitational force encountered at the destination. Likewise, the return journey from Mars could have a thrust that gradually builds up from 0.38 G at departure, so that recovery times are reduced upon arrival with Earth. For some space voyages, the weightlessness might only be reduced rather than eliminated.

Figure 1:
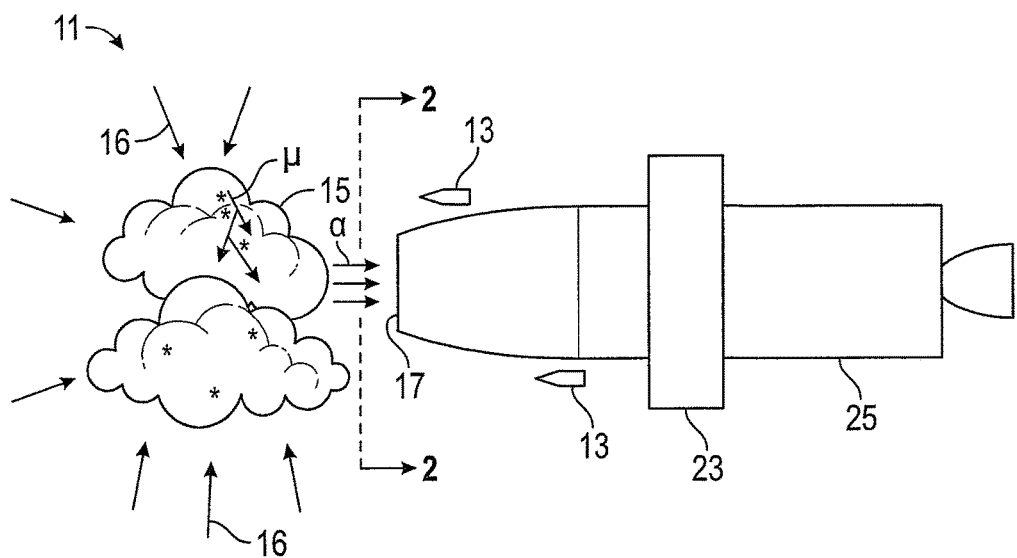
FIG. 1 is a side plan view of a spacecraft shooting projectiles along a trajectory that disperses a cloud of micro-fusion fuel for reaction with cosmic rays and muons according to the present invention.

With reference to FIG. 1, one propulsion technique is to project the micro-fusion target material in a specified direction outward from a spacecraft 11, i.e. along its intended trajectory (generally behind the spacecraft for acceleration, and ahead of the spacecraft for deceleration). The micro-fusion fuel can be solid $Li^6D$ in powder form, D-D or D-T inertial-confinement-fusion-type pellets, $D_2O$ ice crystals, or droplets of (initially liquid) $D_2$. For example, one may shoot "fuel" packages (chips, pellets, powder) loaded in a series of projectiles 13, e.g. once every minute, or once per second for very large spacecraft, which can then disperse the micro-fusion material as a localized cloud 15, much like fireworks or artillery from an antiaircraft gun. The spacecraft propulsion system works in the presence of an ambient flux 16 of cosmic rays and/or muons which interact with the cloud 15 and trigger the nuclear micro-fusion of the particle target material, either by particle-target micro-fusion or muon-catalyzed micro-fusion or both. Fusion products having significant kinetic energy (e.g. alpha particles) are generated and are received at some portion of the spacecraft (e.g. the flat nose 17, a much larger diameter disc on the flat nose 17, the larger diameter forward surface of the gun 23 mounted around the spacecraft, or some other pusher arrangement, like those described in Projects Orion, Daedalus, or Longshot) to produce thrust upon the spacecraft 11. The thrust results in continuous acceleration (or deceleration) of the spacecraft with a specified trajectory. The acceleration or deceleration is experienced by the astronaut crew as artificial gravity.

Stored fuel packages will be shielded, at least within the casing of the projectiles themselves, to reduce or eliminate premature fusion events until delivered and dispersed as a cloud behind the spacecraft (for acceleration) or in front of the spacecraft (for deceleration). An inter-planetary astronaut crew will itself need shielding from radiation (which can cause brain damage and other adverse health effects). Therefore, the crew's shielding could double as a shield for the fuel packages. One important source of such shielding will be the spacecraft's water supply, which should be adequate for the task. One need not eliminate cosmic rays or their secondary particles (pions, muons, etc.) to zero, but merely reduce their numbers and energies sufficiently to keep them from catalyzing sufficiently large numbers of fusion events in the stored target particle material. Additionally, since the use of micro-fusion fuel is expected to reduce the required amount of chemical rocket propellant by a factor of about two, one can easily afford the extra weight of some small amount of metal for shielding, if needed. (For example, the Juno spacecraft to Jupiter contains radiation vaults of 1 cm thick titanium to shield its electronics from external radiation. A similar type of vault might be used in this case for the shielding of the stored fuel.) After being shot from the spacecraft, the casing of the projectiles themselves will continue to provide some shielding until dispersal of the target particle material as a cloud.

Figure 2:
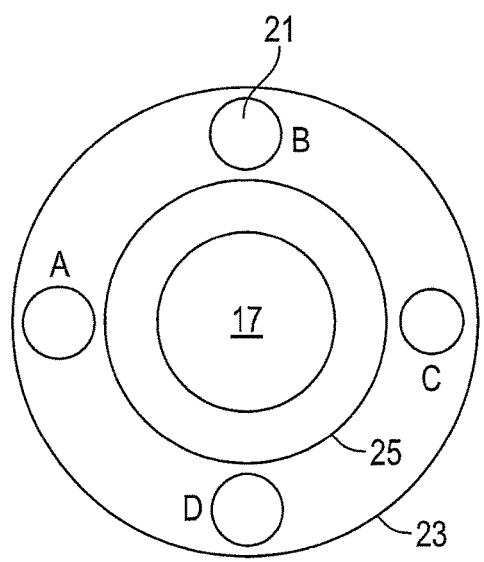
FIG. 2 is a front-end view of the spacecraft of FIG. 1 that illustrates an arrangement of projectile guns housed around a circumference of the spacecraft.

FIG. 2 shows the front-end view of a set of fuel projectile guns 21 (here four in number, labeled A-D, as an example, although the Mars Colonial Transporter could house 100 of them) located in a housing 23 surrounding a circumference of the shell 25 of the spacecraft 11. The flat nose 17, a large disc covering it, or other mechanism of the spacecraft for receiving the kinetic-energy-containing fusion products can also be used.

Soon after the projectile has reached a desired distance from the spacecraft the fuel package releases its particle target material. For example, a chemical explosion can be used to locally disperse the micro-fusion material. The dispersed cloud of target material will be exposed to both cosmic rays and especially during landing to their generated muons. As cosmic rays collide with micro-fusion targets and dust, they form muons that are captured by the deuterium and that catalyze micro-fusion. Likewise, the cosmic ray collisions themselves can directly trigger particle-target micro-fusion. In order to assist muon formation for muon-catalyzed fusion, especially when $D_2O$ or $D_2$ is used, the target package may contain up to 20% by weight of added particles of fine sand or dust.

Besides D-D micro-fusion reactions, other types of micro-fusion reactions may also occur (e.g. D-T, using tritium generated by cosmic rays impacting the lithium-6; as well as $Li^6$-D reactions from direct cosmic ray collisions). For this latter reaction, it should be noted that naturally occurring lithium can have an isotopic composition ranging anywhere from as little as 1.899% to about 7.794% $Li^6$, with most samples falling around 7.4% to 7.6% $Li^6$. Although LiD that has been made from natural lithium sources can be used in lower thrust applications or to inhibit a runaway macro-fusion event, fuel material that has been enriched with greater proportions of $Li^6$ is preferable for achieving greater thrust and efficiency.

The micro-fusion reaction creates successive miniature suns, a kind of "external" combustion that will provide thrust against the spacecraft for braking or accelerating. Even the photon radiation applies pressure to help decelerate the spacecraft. However, the amount of energy generated depends upon the quantity of fuel released and the quantity of available cosmic rays and muons. Assuming most of the energy can be captured and made available for thrust, an estimated $10^{15}$ individual micro-fusion reactions (less than 1 μg of fuel consumed) per second would be required for 1 kW output. But as each cosmic ray can create hundreds of muons and each muon can catalyze 100 micro-fusion reactions, the available cosmic ray flux in interplanetary space is believed to be sufficient for this rocket thrust purpose following research, development, and engineering efforts. The fusion-powered thrust may be supplemented or replaced for certain portions of the journey (e.g. from launch to Earth orbit) with chemical rocket engines.

A piston area extension may be supplied around the perimeter of the spacecraft for increased thrust during accelerating and braking, and for storage and delivery of the micro-fusion fuel projectiles or "shells" using a set of four or more "guns" that fire the projectiles forward or backward from the vehicle. The spacecraft effectively acts as the equivalent of a piston in an external combustion engine and the volume of the continuous slow micro-fusion creates high velocity fusion products (alpha particles, etc.) that bombard the front of the spacecraft and its piston area extensions. The needed of firing depends on the amount of deceleration required, the amount of fusion obtained from the ambient cosmic ray and/or muon flux, the dispersal rate of the fuel cloud from in front of the craft, and the efficiency of the transfer of the fusion products into thrust, but could be expected to be as much as one shell every few seconds for some spacecraft and one shell per second for the largest spacecraft for the duration of the accelerating or braking period. A large diameter flat nose cap can be mounted on the front of the spacecraft to increase the efficiency of thrusting for accelerating and braking.

Additionally, it may be possible to generate electrical or magnetic fields, e.g. by charging the piston area extensions or large diameter flat disc, or by magnetizing the same or the spacecraft as a whole, to help steer cosmic rays toward the fusion fuel particle cloud (and away from astronaut crew areas) or to focus the electrically charged, high velocity helium nuclei fusion products onto the spacecraft's thrusting surfaces. This will increase thrust efficiency by capturing a greater portion of the kinetic-energy-bearing fusion products.

Figure 3:
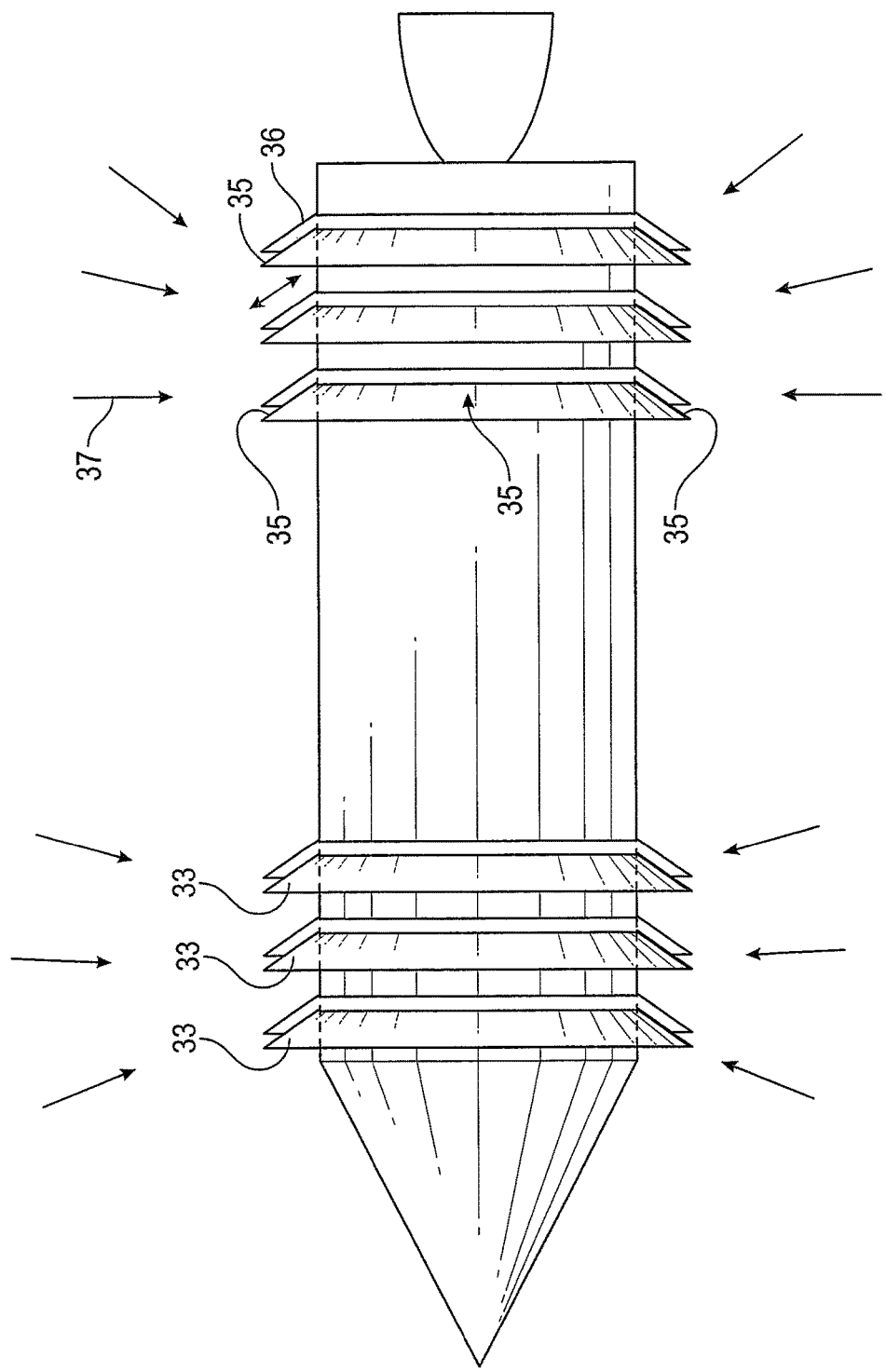
FIG. 3 is side plan view of a spacecraft with an alternative propulsion method in which micro-fusion fuel material is coated upon a set of angled ring structures surrounding the outer shell of the spacecraft.

With reference to FIG. 3, in yet another embodiment, the spacecraft 31 may have a set of ring structures 33 arranged around the outside of the spacecraft and which are oriented at 45° to the length of the spacecraft and direction of thrust. These ring structures 33 are coated with the micro-fusion target material 35, such as chips of lithium-6 deuteride, or deuterium-containing capsules, pellets or powder. As the fuel-coated rings 33 are exposed to cosmic rays 37, micro-fusion events are initiated and the fusion products (fast helium nuclei) propel the spacecraft 31, continuously generating an accelerating or decelerating thrust. Additionally, the collisions of cosmic rays with the surface of the fuel-coated ring structures 33 will also generate muons that will further catalyze micro-fusion of the fusion material 35.

The amount of thrust might be controlled by shielding (or withdrawing shielding from) a specified number of the rings 33. Such shields 36 may be slid in or out through corresponding slots in the outer shell 39 of the spacecraft 31 to cover the coating 35 on the rings 33. Alternatively, the fuel-coated rings might be pivoted to different angles relative to the length of the spacecraft. For that purpose, the rings would not be a unitary structure but a set of individual shingles arranged around the circumference of the spacecraft. Pivoting such shingles, would also allow the rings to be turned with the micro-fusion fuel coating facing inward when shielded storage is desired.

Figure 4A:
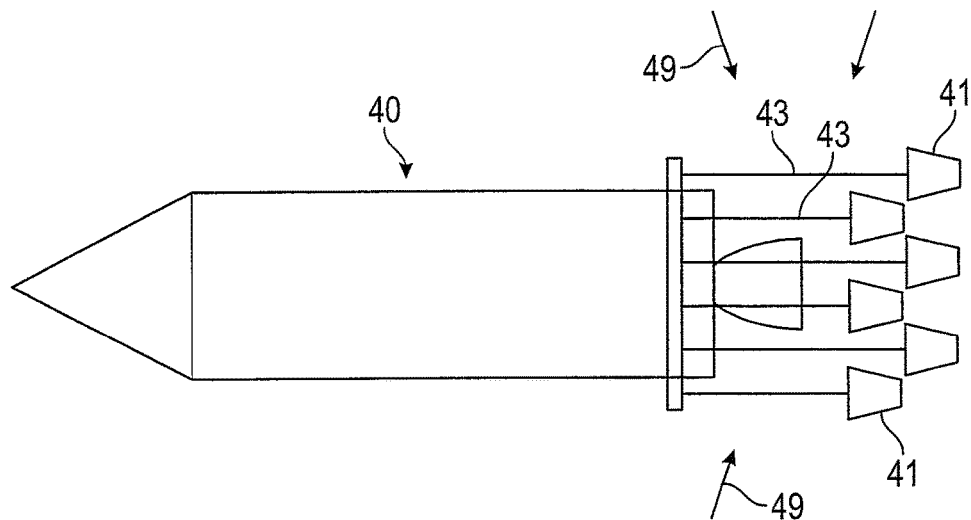
FIG. 4A is a side plan view of a spacecraft towing a set of turbine electric generators outside of the craft, where the generators are powered by reaction of ambient cosmic rays and muons with a dispersed cloud of micro-fusion fuel.
Figure 4B:
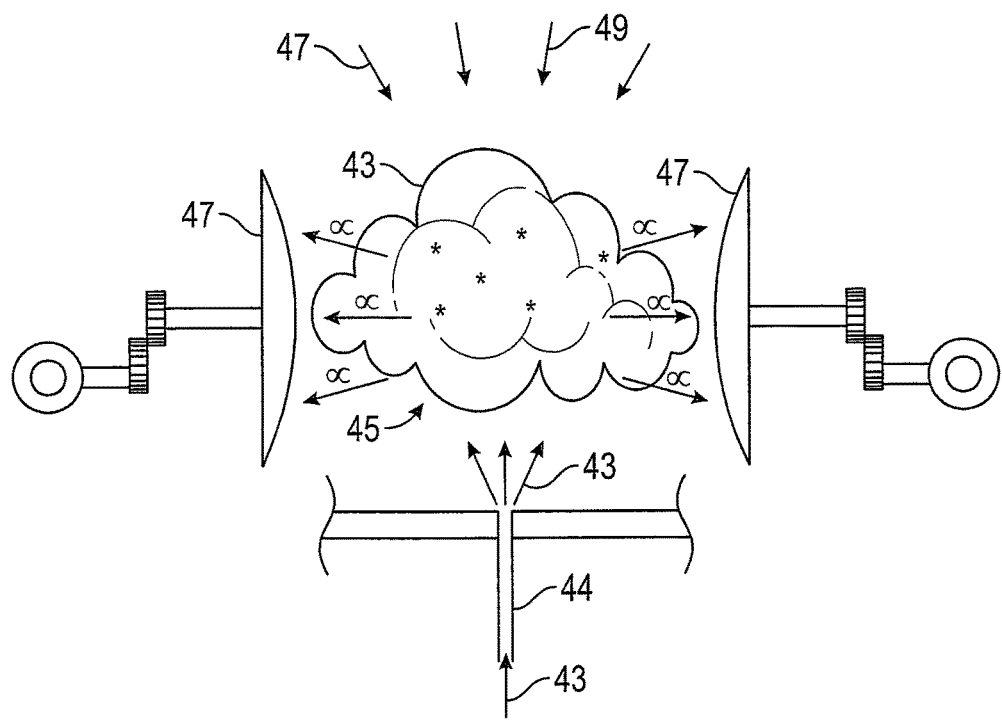
FIG. 4B is an enlarged sectional view of one turbine electric generator from FIG. 4A.
Figure 5:
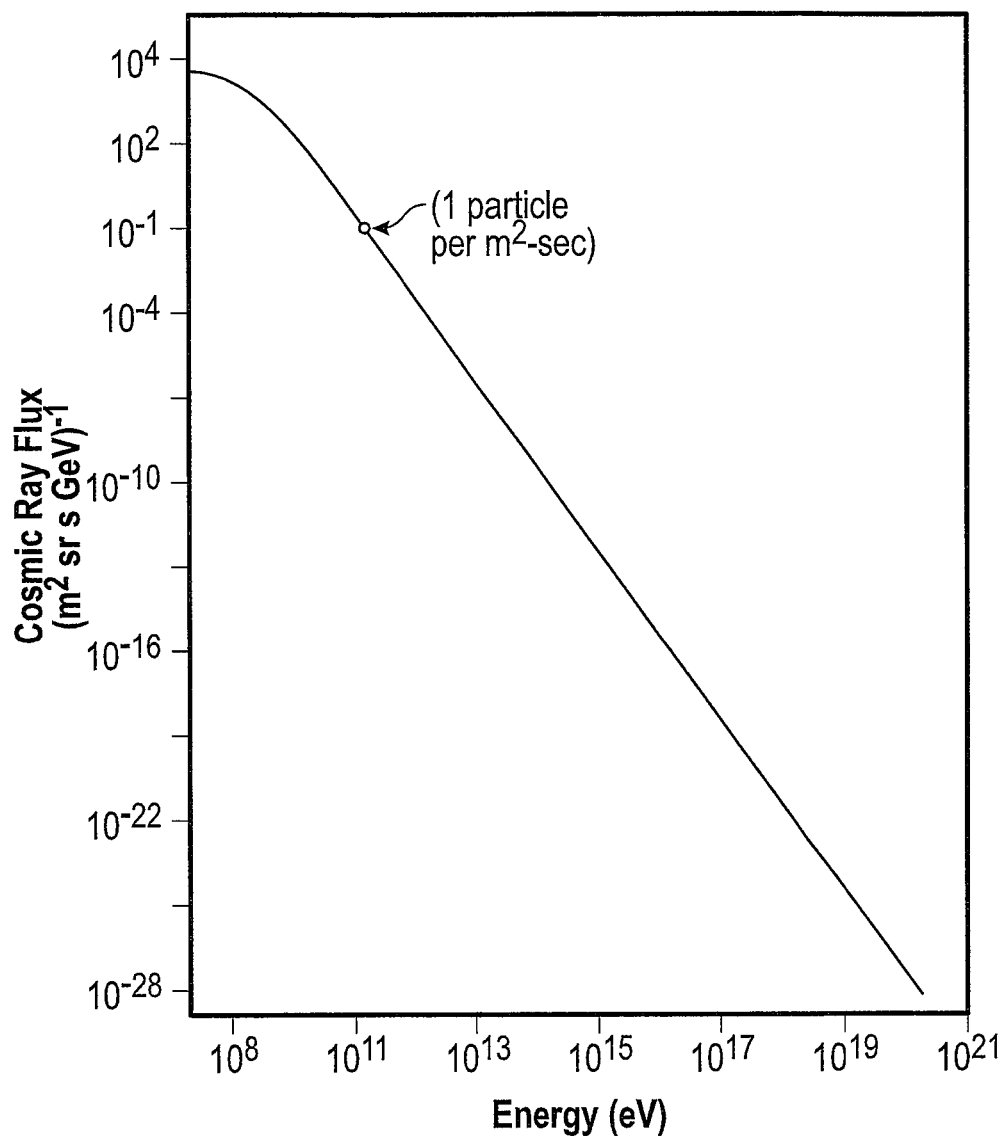
FIG. 5 is a graph of cosmic ray flux at the Earth surface versus cosmic ray energy.

In a further embodiment shown in FIGS. 4A and 4B, the spacecraft 40 may have a series of turbine electric generators 41 attached to its exterior via cables 43, where the turbines are driven by the fast helium nuclei micro-fusion products generated from dispersed lithium-6 deuteride or other deuterium-containing micro-fusion target material exposed to the cosmic rays. Alternatively, instead of having cables 43 trailing the spacecraft, the turbine electric generators 41 might be mounted on a narrow metal web as long as about five space-crafts, with the spacecraft located in the center. Micro-fusion fuel packages would be delivered to the vicinity of each of the turbines, however those turbines are mounted or located relative to the spacecraft. The turbines can generate electricity for powering the spacecraft or for powering an ion thruster. Likewise, a set of solar panels covering the exterior of the spacecraft could generate electricity for powering the spacecraft or ion thruster.

In FIG. 4B, one such turbine electric generator 41 is seen. A cloud of deuterium-containing micro-fusion target fuel 43, e.g. particles of $Li^6D$, is dispersed from a flue 44 into a volume 45 between two or more helium-wind turbines 47. High-energy cosmic rays 49 entering the volume 45 interact with the micro-fusion target fuel material 43 to cause nuclear fusion events. Fusion products, mainly high energy helium nuclei (alpha particles), direct kinetic energy to the turbine blades to turn the turbines 47 and generate electricity.

Ion thrusters are currently in use by NASA for a variety of geosynchronous satellites, as well as for the Dawn spacecraft (launched in 2007) for exploring the asteroid belt (including Ceres and Vesta). In an ion thruster, propellant (e.g. xenon) is ionized by electron bombardment to create a plasma and the positive ions in the plasma are then accelerated from the thruster chamber to produce thrust. Whether powered by solar cells or as describe here for fusion-driven turbine generators, a sufficient reserve of propellant will be needed for the length of both the outgoing and return journeys.

While the embodiment of the present invention described herein only utilizes thrust created by the kinetic energy of helium nuclei micro-fusion products that directly bombard the spacecraft, other embodiments may create thrust via the helium nuclei micro-fusion products impacting outboard parachutes or sails connected to the craft, thereby capturing kinetic energy of micro-fusion products moving away from the spacecraft.

What is claimed is:

1. A method of spacecraft propulsion system for use in the presence of an ambient flux of cosmic rays, comprising:
   projecting successive packages of deuterium-containing particle fuel material in a specified direction outward from a spacecraft, the material interacting with the ambient flux of cosmic rays to generate products having kinetic energy; and
   receiving on the spacecraft at least some portion of the generated kinetic-energy-containing products to produce thrust upon the spacecraft;
   wherein the deuterium-containing particle fuel material is successively projected from the spacecraft in amounts and direction such that the thrust produces a repeated or continuous acceleration of the spacecraft with a specified trajectory.

2. The propulsion method as in claim 1, wherein the repeated or continuous acceleration has a substantially constant magnitude throughout a substantial portion of a spacecraft flight to a destination.

3. The propulsion method as in claim 2, wherein the substantially constant magnitude acceleration is in a first forward direction along the spacecraft trajectory for a first half of the spacecraft flight to its destination and in a second opposite direction producing equivalent deceleration for a second half of the spacecraft flight.

4. The propulsion method as in claim 2, wherein the destination is a planet and the substantially constant magnitude of the acceleration is equal to a specified proportion of gravitational acceleration at the planet's surface, the specified proportion being at least 25%.

5. The propulsion method as in claim 4, wherein the destination is Mars and the substantially constant magnitude of acceleration during the spacecraft flight is at least 40% of the surface gravitation on Mars.

6. The propulsion method as in claim 1, wherein the deuterium-containing particle fuel material is Li6D.

7. The propulsion method as in claim 1, wherein the deuterium-containing particle fuel material is D2O.

8. The propulsion method as in claim 1, wherein the deuterium-containing particle fuel material is D2.

9. The propulsion method as in claim 1, wherein the deuterium-containing particle fuel material is in solid powder form.

10. The propulsion method as in claim 1, wherein the deuterium-containing particle fuel material is in pellet form.

11. The propulsion method as in claim 1, wherein the deuterium-containing particle fuel material is in frozen form.

12. The propulsion method as in claim 1, wherein the deuterium-containing particle fuel material is in liquid droplet form.

13. The propulsion method as in claim 1, wherein the successive packages are shell projectiles shot from at least one gun forming a part of the spacecraft.

14. The propulsion method as in claim 1, wherein each package is configured to disperse the deuterium-containing particle fuel material as a localized cloud at a specified distance from the spacecraft.

15. The propulsion method as in claim 14, wherein dispersal of the deuterium-containing particle fuel material is by means of chemical explosive.

16. The propulsion method as in claim 1, wherein the packages of deuterium-containing particle fuel material also contain up to 20% by weight of added particles of fine sand or dust.

\* \* \* \* \*